Patented Nov. 3, 1925.

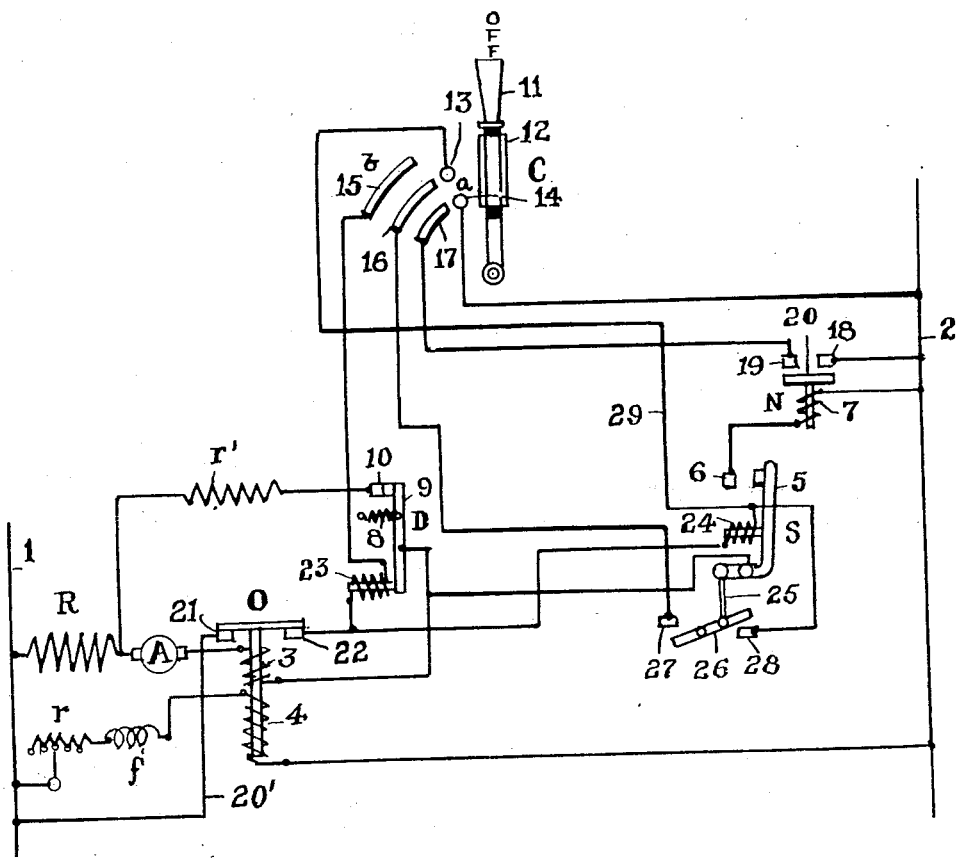

1,559,832

UNITED STATES PATENT OFFICE.

DAVID C. WRIGHT, OF EUCLID, AND PHILIP V. TIPPET, OF CUYAHOGA FALLS, OHIO.

ELECTRIC CONTROLLER.

Application filed April 13, 1925. Serial No. 22,548.

*To all whom it may concern:*

Be it known that we, DAVID C. WRIGHT and PHILIP V. TIPPET, citizens of the United States, residing, respectively, at Euclid, in the county of Cuyahoga and State of Ohio, and at Cuyahoga Falls, in the county of Summit and State of Ohio, have invented new and useful Improvements in Electric Controllers, of which the following is a specification.

Our invention relates to systems for the control of electric motors. While our invention was primarily made for use with wire-drawing blocks or machines, it may be used for various other purposes.

One object of this invention is to provide means including dynamic braking for stopping an electric motor in case of no load on the motor. In cases where one man has charge of several wire drawing machines driven by individual electric motors, he can not give his attention to each machine all the time. It is therefore advisable to provide separate means for stopping each motor in case a wire breaks or in case of any other condition which allows the motor to operate at no load. If the motor is not stopped when no load conditions arrive, the free end of the wire on the reel which continues to revolve may cause damage to the machine or the operator.

Another object is to provide overload protection for the gearing of a wire drawing or other machine when operated by an adjustable speed direct current shunt wound motor or a compound wound electric motor with light compounding.

It is well known that the horsepower capacity of a gear train is greater at high speeds than at low speeds. The ordinary circuit breaker or overload relay, which depends on motor current for operation will not necessarily protect both the motor and the gear train, as the current capacity of the motor is constant throughout the whole speed range, and is of a higher value than the current capacity of the gear train at slow speeds. It is one object of this invention to provide protection to both the motor and the gear train by means of an overload relay which will operate on a lower current value at slow speeds and on a higher current value at high speeds. Other objects appear hereinafter.

The drawing shows one embodiment of our invention diagrammatically.

On the drawing, A designates the armature of a direct current electric motor having the shunt field winding $f$. The current-supply wires are marked 1 and 2. O is the overload relay having the winding 3 in series with the armature A and the winding 4 in series with the shunt field $f$ and the adjustable resistance $r$. In series with the armature circuit is the electromagnetic contactor S having the movable contact member 5 and the fixed contact 6, the latter being connected to the wire 2 through the winding 7 of the no load relay N. The armature A is provided with a shunt circuit containing the resistance $r'$ and the contactor D held yieldingly in closed position by the spring 8. The contactor has the movable contact 9 and the fixed contact 10.

C designates a manually operated controller having the movable member 11 with the contact 12 adapted in position $a$ to bridge the fixed contacts 13 and 14, and in position $b$ the fixed contacts 15, 16, and 17. The wire 2 is connected to the contact 14 and to the contact 18 of the relay N, the other fixed contact 19 of the relay being connected to the contact 17. The relay has the movable contact 20 operated by the winding 7 and adapted to bridge the contacts 18 and 19.

The wire 20' connects the wire 1 to the fixed contact 21 of the relay O, the other fixed contact 22 of this relay being connected through the winding 23 of the contactor D to the contact 15, and through the winding 24 of the contactor S and wire 29 to the contact 13. The contactor S when it closes operates through the link 25 the auxiliary switch 26 so as to bridge the contacts 27 and 28, the former being connected to the contact 16, and the latter to the wire 29 between the contact 13 and the winding 24.

If the movable member 11 is moved to position $a$, current flows from the supply wire 2 through the contacts 14, 12, and 13, the winding 24, the contacts of the relay O and the wire 20' to the supply wire 1. The current in this circuit energizes the winding 24 of the contactor S and causes it to close the armature circuit, through which current flows from the wire 2 through the winding 7, the contactor S, the winding 3, the armature A, and the resistance R to the wire 1. The armature will turn under the excitation of the field winding, but the speed will be slow owing to the dynamic braking circuit being closed through the contactor D.

The energization of the winding 7 caused the closure of the no load relay N and the closure of the contactor S caused the closure of the switch 26. When the controller member 11 is moved upon the contacts 15, 16 and 17, current flows from the wire 2 through the contacts 18, 20, 19, 17, and 16, the contact 27, the switch 26, and the contact 28, the winding 24, the contacts of the relay O and the wire 20' to the wire 1. The current in this circuit supplies current to the winding 24, which maintains the contactor S closed after the contact 12 has left the contacts 13 and 14, the contact 12 temporarily bridging the space between the contacts on the position a and the contacts on the position b, so that the winding 24 will not be deenergized when the member 11 moves from the position a to the position b. Current also flows from the contact 16 through the contact 15, the winding 23, the contacts of the relay O and the wire 20' to the supply wire 1. The current in this circuit energizes the winding 23 which opens the contactor D against the tension of the spring 8, thus removing the dynamic braking circuit from the motor circuit and allowing the armature to assume normal speed. The resistance R is shown as a single block, but any suitable acceleration system may be added to remove the resistance in steps as the motor speeds up.

In case the load on the motor is removed, as by the breaking of the wire being drawn by a machine using our controller, the series relay N drops open, thereby opening the circuit through the winding 24 of the contactor S which thereupon drops open and opens the armature circuit. At the same time the winding 23 is deprived of current and allows the spring 8 to close the contactor D and the dynamic braking circuit which quickly brings the armature to rest.

In order to start the motor again the member 11 must be moved to position a in order to energize the winding 24 and cause the closure of the armature circuit as hereinbefore described.

The overload relay O has the series winding 3 and the shunt winding 4, the former having a small number of turns and the latter a high number of turns. Shunt field current at slow armature speed is of a higher value than shunt field current at high speeds of the armature. Since the armature current capacity of a gear train is low at slow speeds, and high at fast speeds, it is possible to design the two windings of the relay so that the ampere turns produced by the combined series and shunt windings will be approximately constant at all speeds. By properly proportioning the windings the relay can be designed to operate approximately at the horsepower capacity of the gear train for all speeds from minimum to maximum. The windings of the relay can be made so that the single relay can be used to protect not only the gear train from overloads, but also to protect the motor from overloads. The number of turns in the two windings can be proportioned to make it operate on a current value at the slowest speed to protect the gear train and at a current value at the highest speed to protect the motor.

We claim—

1. In a system for controlling direct current motors, an electric motor, a circuit therefor, an electromagnetic contactor for closing the circuit, an underload relay having its operating winding in the said circuit, and a master controller having in the running position contacts in the circuit of the contacts of the relay and in the circuit of the winding of the contactor, and having in starting position contacts short-circuiting the contacts of the relay and including the winding of the contactor.

2. In a system for controlling direct current motors, an electric motor, a circuit therefor, an electromagnetic contactor for closing the circuit, an underload relay having its operating winding in the said circuit, a master controller having in the running position contacts in the circuit of the contacts of the relay and in the circuit of the winding of the contactor, and having in starting position contacts short-circuiting the contacts of the relay and including the winding of the contactor, and means maintaining the said winding energized when the master controller passes from the starting to the running position.

3. In a system for controlling direct current motors, an electric motor, a circuit therefor, a dynamic braking circuit including a switch therefor biased to closed position and an electromagnet for opening the switch, a master controller having contacts in running position for energizing the winding of the magnet, and an electromagnetic underload switch having the contacts in circuit with the winding of the magnet.

4. In a system for controlling direct current motors, an armature, a shunt field therefor, an overload relay having two energizing windings, one in series with the armature and the other in series with the shunt field, the windings being proportioned so that the sum of their ampere turns is substantially constant for all speeds of the armature.

In testimony whereof we hereunto affix our signatures this 31st day of March, 1925.

DAVID C. WRIGHT.
PHILIP V. TIPPET.

DISCLAIMER.

1,559,832.—*David C. Wright*, Euclid, and *Philip V. Tippet*, Cuyahoga Falls, Ohio. ELECTRIC CONTROLLER. Patent dated November 3, 1925. Disclaimer filed November 26, 1927, by the patentees.

Hereby enter this disclaimer to the matter defined by all the claims of the said Letters Patent, which claims are in the following words, to wit:

" 1. In a system for controlling direct current motors, an electric motor, a circuit therefor, an electromagnetic contactor for closing the circuit, an underload relay having its operating winding in the said circuit, and a master controller having in the running position contacts in the circuit of the contacts of the relay and in the circuit of the winding of the contactor, and having in starting position contacts short-circuiting the contacts of the relay and including the winding of the contactor.

" 2. In a system for controlling direct current motors, an electric motor, a circuit therefor, an electromagnetic contactor for closing the circuit, an underload relay having its operating winding in the said circuit, a master controller having in the running position contacts in the circuit of the contacts of the relay and in the circuit of the winding of the contactor, and having in starting position contacts short-circuiting the contacts of the relay and including the winding of the contactor, and means maintaining the said winding energized when the master controller passes from the starting to the running position.

" 3. In a system for controlling direct current motors, an electric motor, a circuit therefor, a dynamic braking circuit including a switch therefor biased to closed position and an electromagnet for opening the switch, a master controller having contacts in running position for energizing the winding of the magnet, and an electromagnetic underload switch having the contacts in circuit with the winding of the magnet.

" 4. In a system for controlling direct current motors, an armature, a shunt field therefor, an overload relay having two energizing windings, one in series with the armature and the other in series with the shunt field, the windings being proportioned so that the sum of their ampere turns is substantially constant for all speeds of the armature."

[*Official Gazette December 13, 1927.*]